United States Patent
Friedman et al.

[15] 3,659,502
[45] May 2, 1972

[54] RECIPROCATING ENGINES

[72] Inventors: Milton I. Friedman, 2120 Hillholm St.; Theodore Kordell, RD. 4, Box 180-D, both of Johnstown, Pa. 15905

[22] Filed: Aug. 28, 1970

[21] Appl. No.: 67,952

[52] U.S. Cl. ..................................92/84, 92/137, 92/187, 92/212, 92/249
[51] Int. Cl. ..........................................F16j 1/14
[58] Field of Search.................92/84, 137, 187, 212, 216, 92/249, 256; 287/20 P; 123/193 P

[56] References Cited

UNITED STATES PATENTS

| 312,495 | 2/1885 | Nash | 92/187 X |
| 1,450,177 | 4/1923 | Houpert | 92/84 |
| 3,161,185 | 12/1964 | Justinien et al. | 92/187 X |
| 3,375,972 | 4/1968 | Raufeisen | 92/212 X |

Primary Examiner—Martin P. Schwadron
Assistant Examiner—Irwin C. Cohen
Attorney—Buell, Blenko & Ziesenheim

[57] ABSTRACT

A reciprocating engine is provided having a hollow cylinder and spaced crankshaft with an eccentric cam, a piston slidable in said cylinder with radial clearance, a plurality of spaced annular grooves around the piston circumference, a ring of resin having a low coefficient of friction in each said groove between the piston and cylinder, a connecting rod connected at one end to said crankshaft through a prelubricated anti-friction bearing and at the other end to the piston by a deflectable member capable of angular deflection.

8 Claims, 3 Drawing Figures

Patented May 2, 1972

3,659,502

INVENTORS
Milton I. Friedman &
Theodore Kordell

RECIPROCATING ENGINES

This invention relates to reciprocating engines and particularly to reciprocating devices which move in a straight line and are driven by a rotating crank or cam and which require no lubrication. Typical of such devices are air compressors, internal combustion engines and the like, which have a reciprocating piston connected to a crankshaft by a connecting rod.

Reciprocating devices of the type mentioned above have long been known and used. However, such devices generally require that a constant supply of oil be delivered to the bearing connecting the connecting rod to the wrist pin in the piston, to the bearing at the opposite end of the connecting rod on the crankshaft and to the piston surfaces which ride on the cylinder walls. In the past, structures like this, have been a problem of considerable significance because it required the use of an oil pump and lines to deliver oil to the bearings and to the cylinder walls. This, of course, is a considerable expense and any failure of oil supply results in a loss of the bearings and binding of the piston in the cylinder wall.

There has long been a need for a reciprocating engine which does not require continuing lubricating and which eliminates the need for oil sumps, oil pumps and oil lines. There have been proposed reciprocating engines using prelubricated sealed bearings. However, these are relatively expensive and are less than satisfactory in many ways. This is particularly true of the connection between the connecting rod and piston where the wrist pin is usually used.

There have been many proposals for reciprocating engine structures designed to eliminate lubrication particularly at the connection between the connecting rod and piston. Typical of such proposals are those of Allinquant U.S. Pat. No. 3,168,301; Kastler U.S. Pat. No. 2,296,469; Perry U.S. Pat. No. 2,574,934 and Rumsey U.S. Pat. No. 3,451,315. None of these structures have met with any significant commercial acceptance because of the high wear rate and expense involved in their use.

We have developed a reciprocating engine which eliminates the need for continuous lubricating, and which provides in particular a mechanism for connecting the piston and connecting rod without use of a lubricated connection.

Preferably, we provide a piston slidable in a cylinder with radial clearance, a plurality of spaced apart annular grooves around the piston, a ring of resin having a low coefficient of friction in each of said groves between the piston and cylinder, a crankshaft spaced from said piston, a connecting rod connected at one end to said crankshaft by a prelubricated anti-friction type bearing and connected at the other end to the piston by a deflectable member capable of angular deflection. Preferably, the ring of resin is a ring of polytetrafluorethylene. The deflectable member is preferably a sheet metal or plastic spring member fixed along one edge to the end of the connecting rod and along the opposite edge to the interior of the piston, diametrically thereof. The anti-friction bearings are preferably ball bearings which are pre-lubricated and need no added lubricant during their useful life.

In the foregoing general statement, we have set out certain objects, purposes and advantages of our invention. Other objects, purposes and advantages will be apparent from a consideration of the following description and the accompanying drawings in which.

Figure 1:
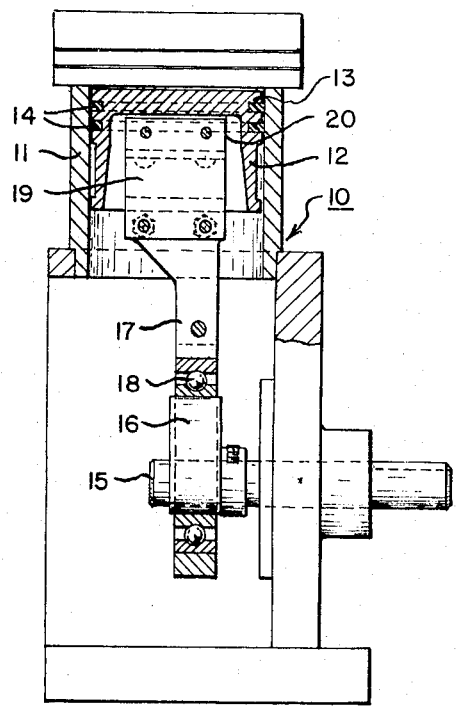
FIG. 1 is a vertical section through an air compressor incorporating our invention.
Figure 2:
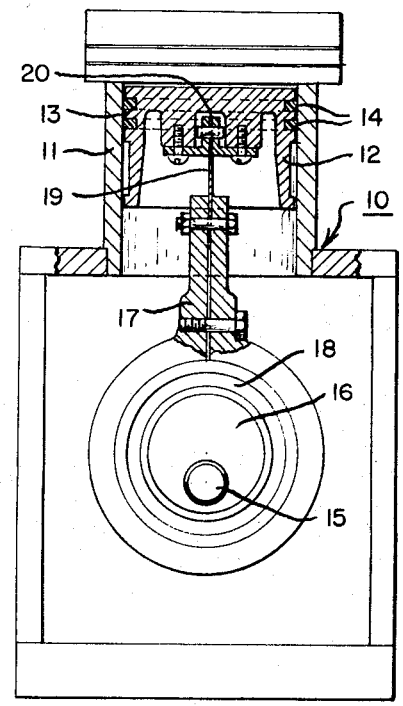
FIG. 2 is a section on the line II—II of FIG. 1.
Figure 3:
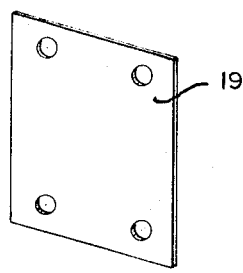
FIG. 3 is a side elevational view of a deflectable member used in our invention.

Referring to the drawings, we have illustrated an air compressor housing 10 including a cylinder 11. A piston 12 having ring grooves 13 is movable longitudinally within cylinder 11. Rings 14 of Teflon (DuPont's polytetrafluoroethylene) are inserted in grooves 13 to bear against the inner wall of cylinder 11. A crankshaft 15 extends through housing 10 below the piston 12 and is provided with a crank eccentric 16. A connecting rod 17 is connected at one end to eccentric 16 by prelubricated ball bearing 18. The other end of the connecting rod 17 is connected to one side of a formed sheet 19 of spring steel. The other side of said sheet of spring steel is connected to a diametrical slot 20 in piston 12.

When the crankshaft is rotated by means of a motor (not shown) the connecting rod moves vertically as well as from side to side at its connection with the crankshaft. This causes the piston 12 to move longitudinally within the cylinder 11 and the spring steel member 19 deflects from side to side in the portion intermediate its connected edges. This deflecting movement provides the necessary articulation between the piston and connecting rod and eliminates the need for a lubricated bearing. The Teflon rings provide the necessary sealing and lubricating action between the piston and cylinder and eliminates the need for a lubricant on the cylinder walls.

While we have illustrated and described a presently preferred embodiment of our invention in the foregoing specification, it will be understood that the invention may be otherwise embodied within the scope of the following claims.

We claim:

1. In a reciprocating engine having a hollow cylinder and spaced crankshaft with an eccentric cam, a piston slidable in said cylinder with radial clearance, a plurality of spaced annular grooves around the piston circumference, a ring of resin having a low coefficient of friction in each said groove between the piston and cylinder, a connecting rod, a prelubricated anti-friction bearing at one end of said connecting rod connecting the same to said crankshaft and a deflectable member capable of annular deflection, said deflectable member being fixed at one edge thereof to said piston and being fixed at an opposite edge thereof to said connecting rod.

2. A reciprocating engine as claimed in claim 1 wherein the resin ring is polytetrafluorethylene.

3. A reciprocating engine as claimed in claim 1 wherein the anti-friction bearing is a ball bearing.

4. A reciprocating engine as claimed in claim 1 wherein the deflectable member is a sheet of spring steel.

5. A reciprocating engine as claimed in claim 1 wherein the deflectable member is a rectangular steel sheet.

6. A piston and connecting rod structure for reciprocating engines comprising a connecting rod connected at one end to a crankshaft, a deflectable member fixed at the other end of said connecting rod at one edge of the deflectable member and a piston connected across its diameter to the opposite edge of said deflectable member spaced from said other end of said connecting rod whereby said connecting rod and piston can assume varying angular relationships through the deflection of said deflectable member.

7. A piston and connecting rod structure as claimed in claim 6 wherein the deflectable member is a metal sheet.

8. A piston and connecting rod structure as claimed in claim 6 wherein the deflectable member is a plastic resin sheet.

* * * * *